Feb. 9, 1943.   S. W. DUNWELL ET AL   2,310,407
MACHINE FOR CHECKING QUOTIENT RESULTS
Filed April 28, 1942   10 Sheets-Sheet 2
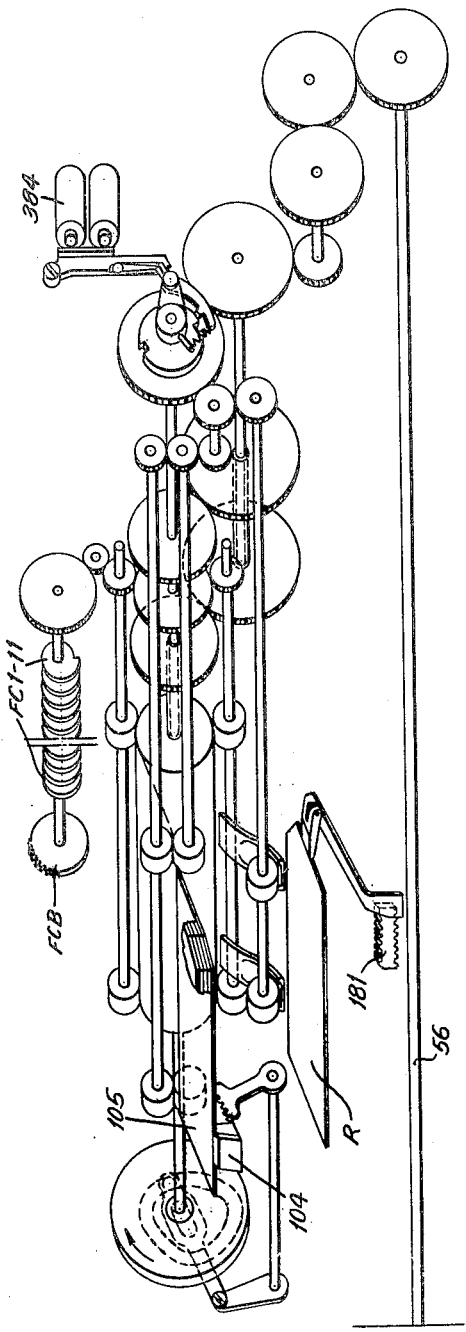
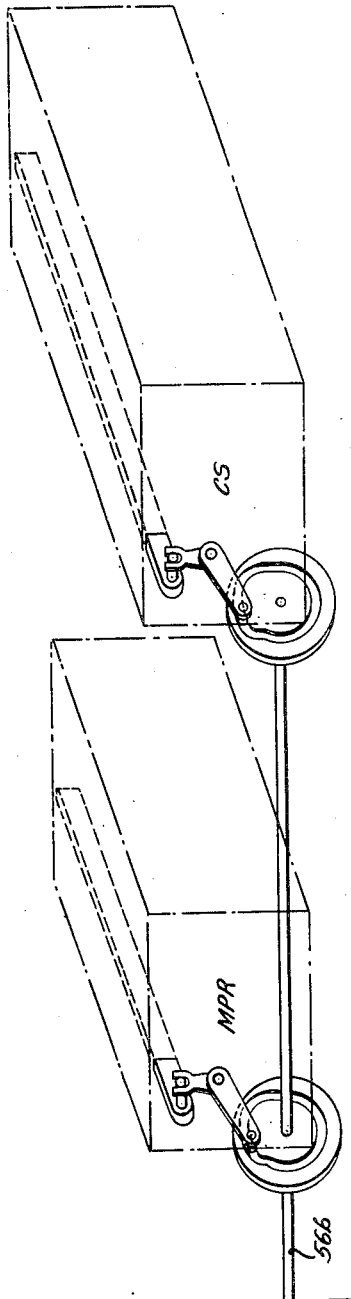
FIG.1a.
INVENTORS
Stephen W. Dunwell
John N. Wheeler
BY
W. M. Wilson ATTORNEY

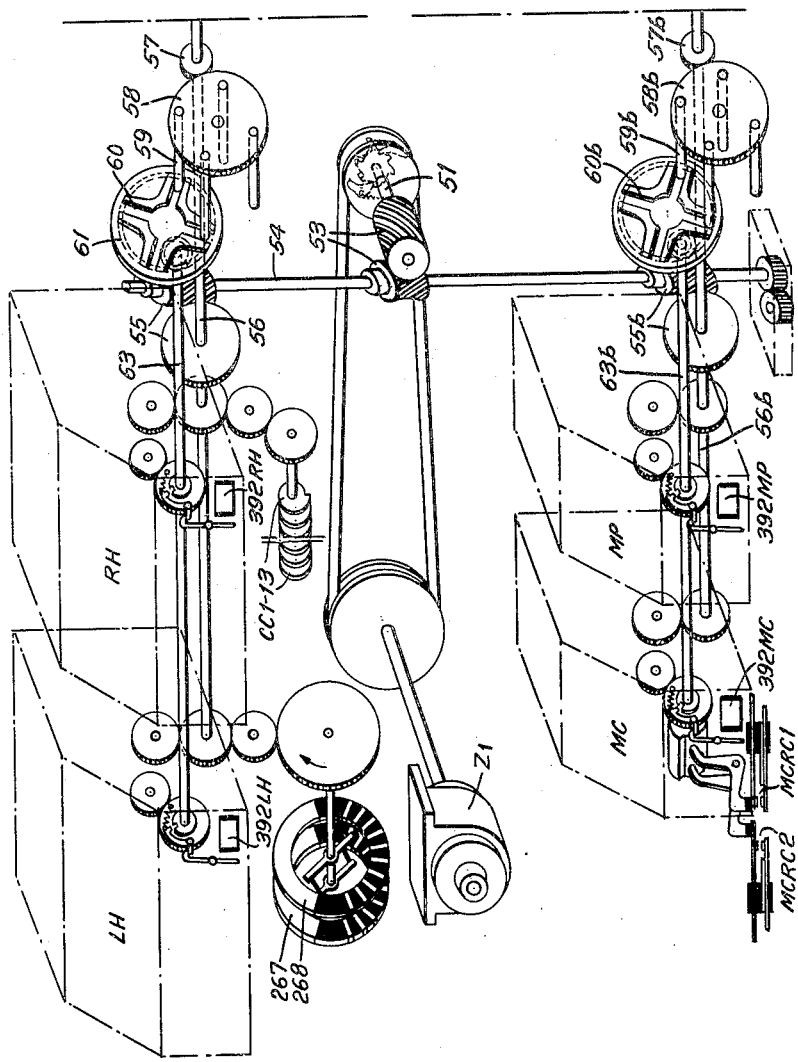

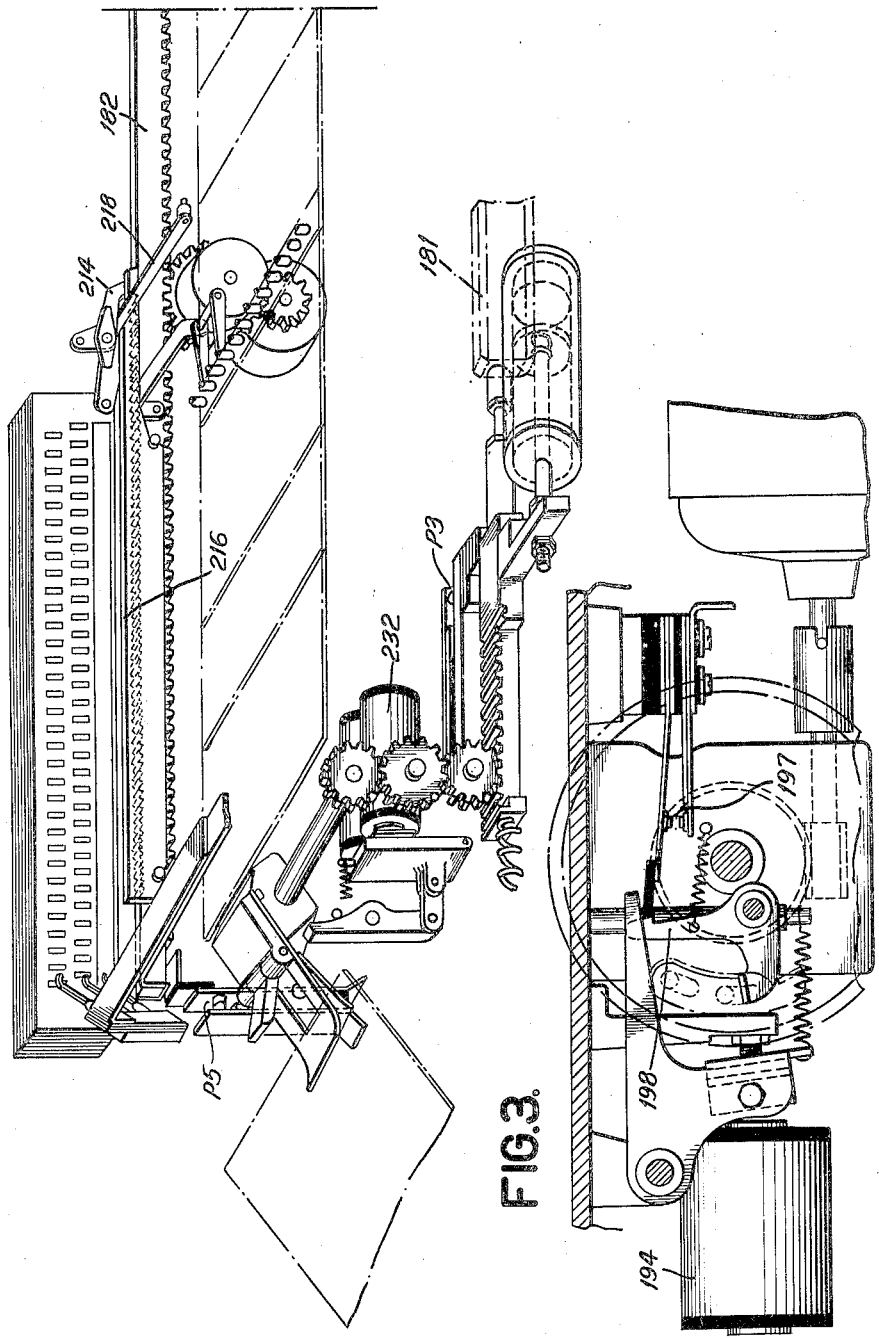

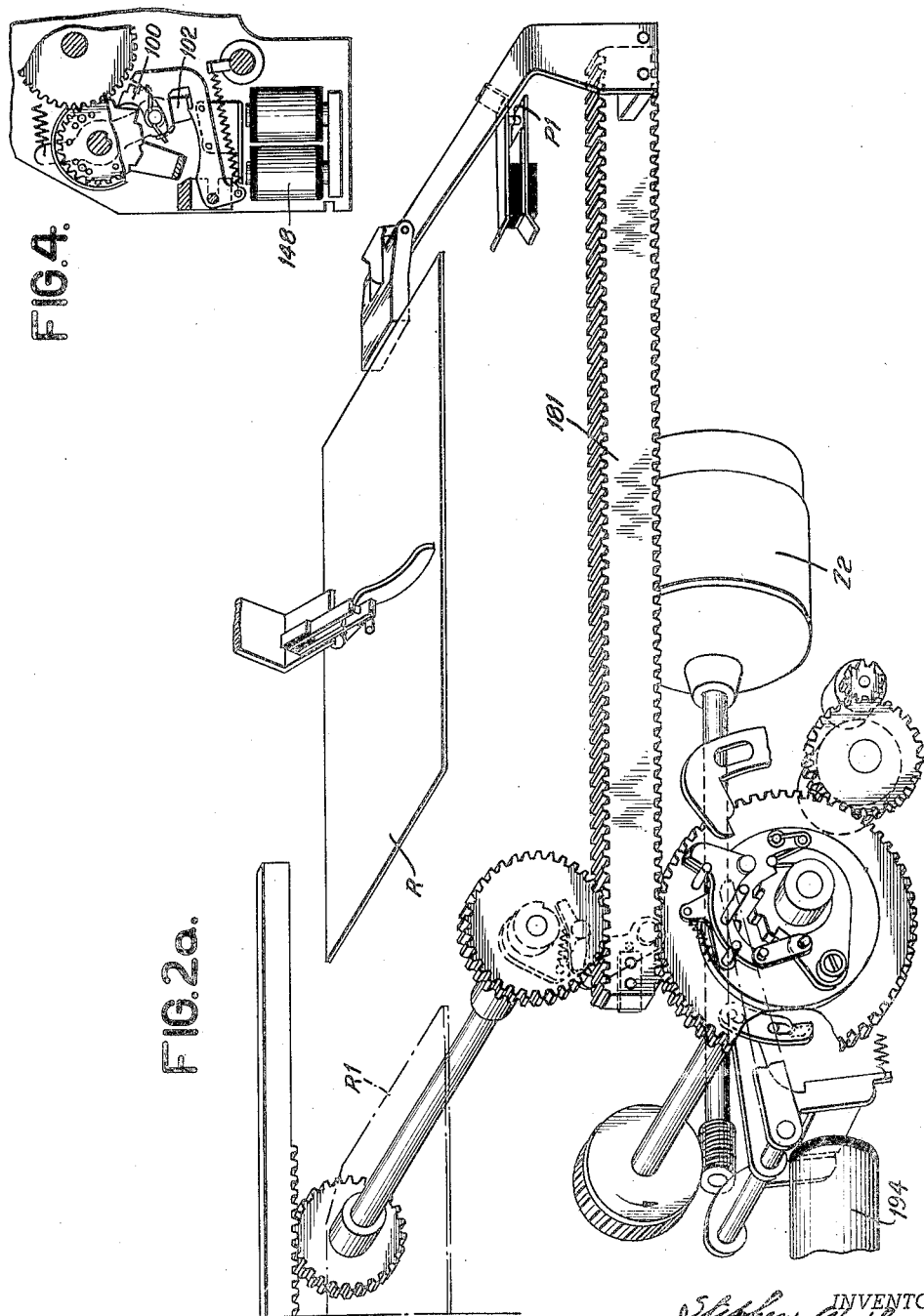

Feb. 9, 1943.    S. W. DUNWELL ET AL    2,310,407
MACHINE FOR CHECKING QUOTIENT RESULTS
Filed April 28, 1942    10 Sheets-Sheet 5
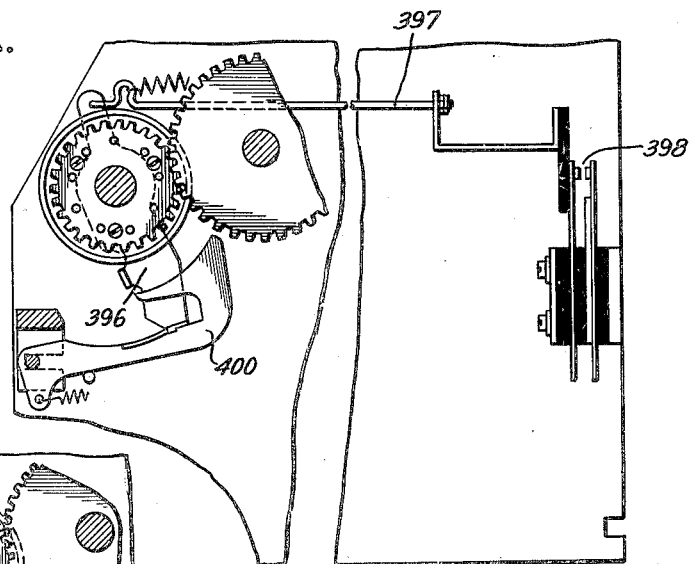
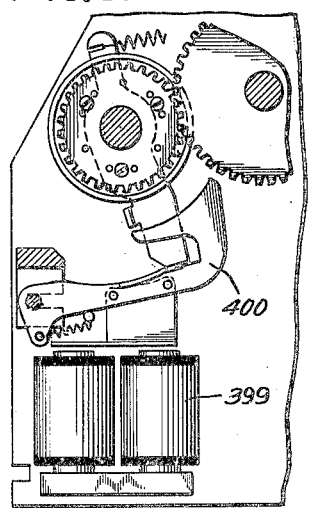
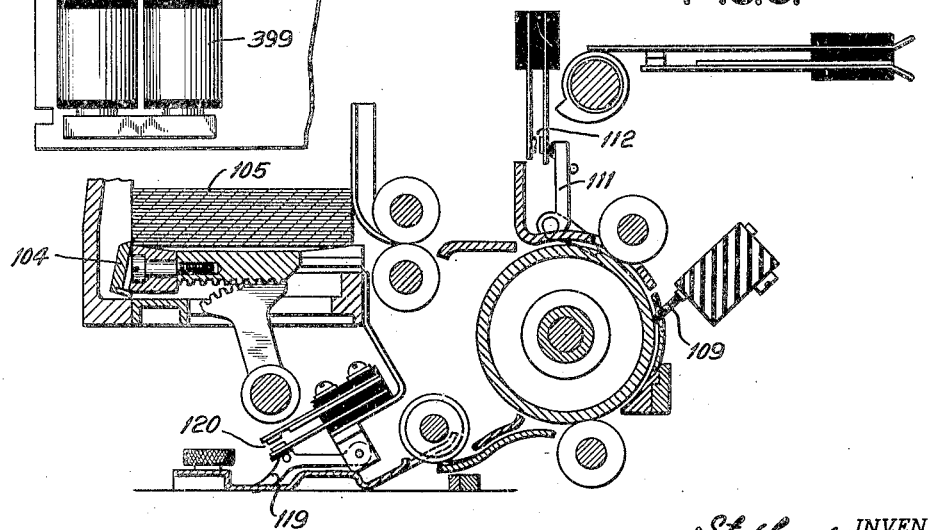

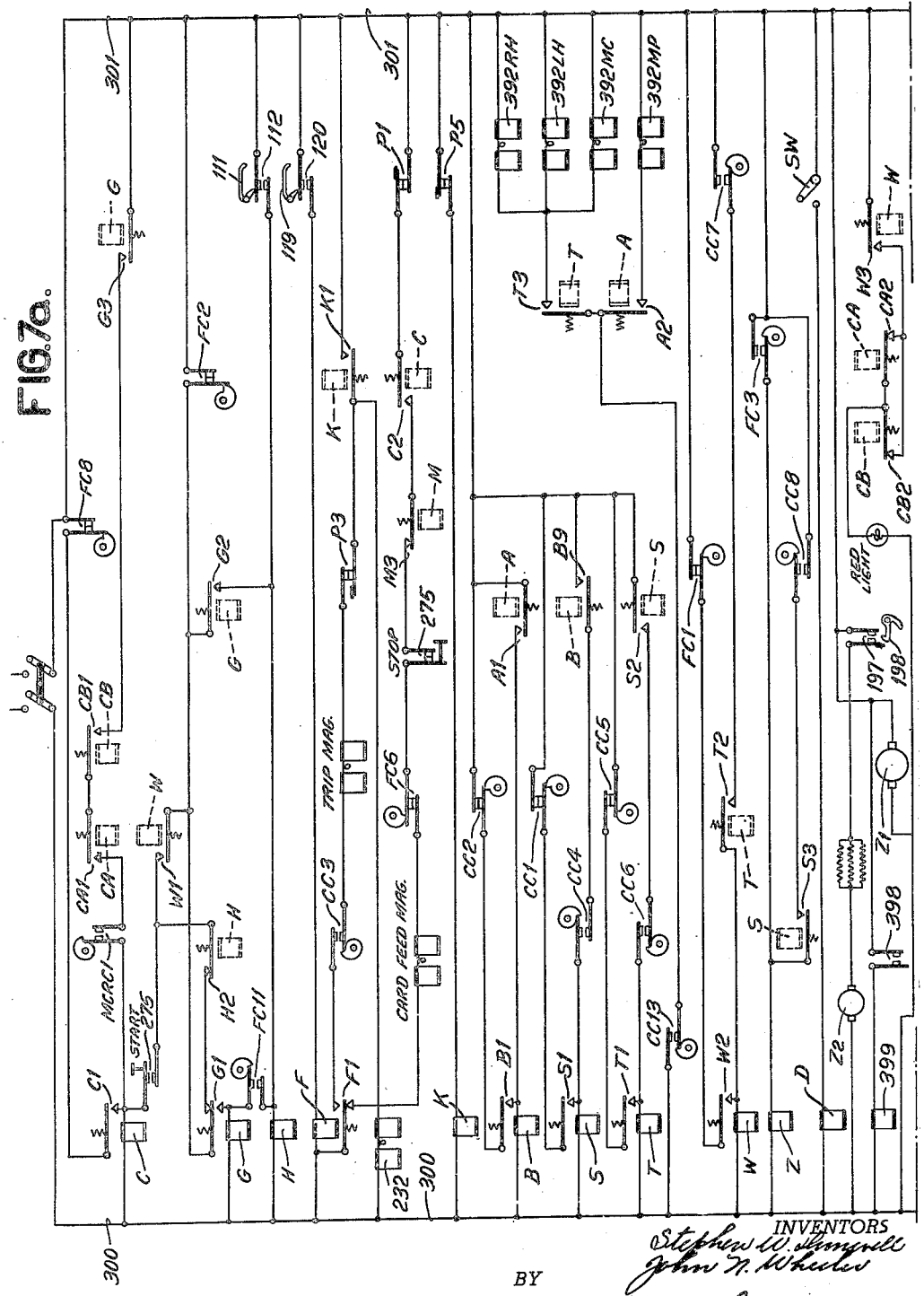

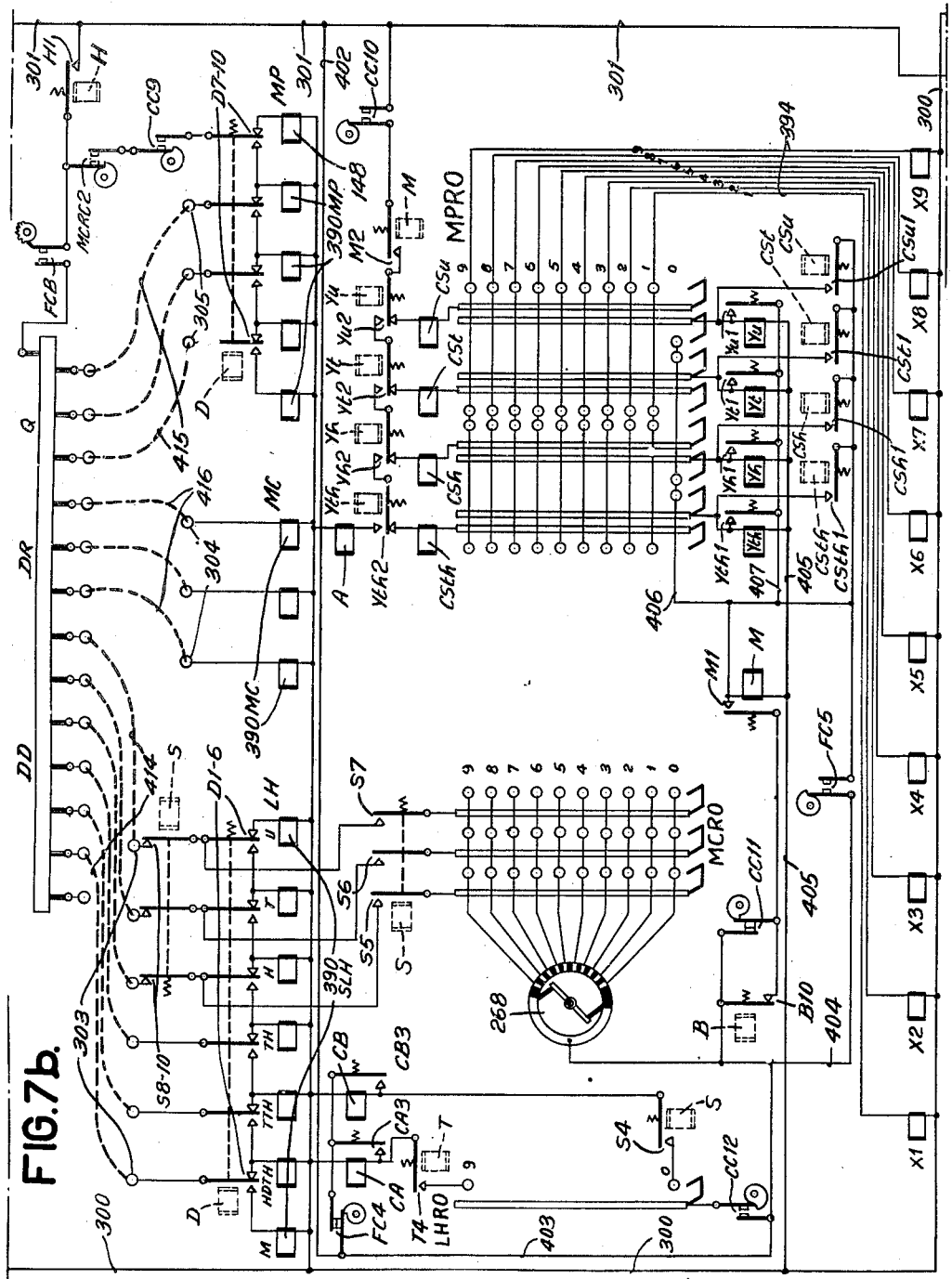

Feb. 9, 1943.    S. W. DUNWELL ET AL    2,310,407
MACHINE FOR CHECKING QUOTIENT RESULTS
Filed April 28, 1942    10 Sheets-Sheet 9
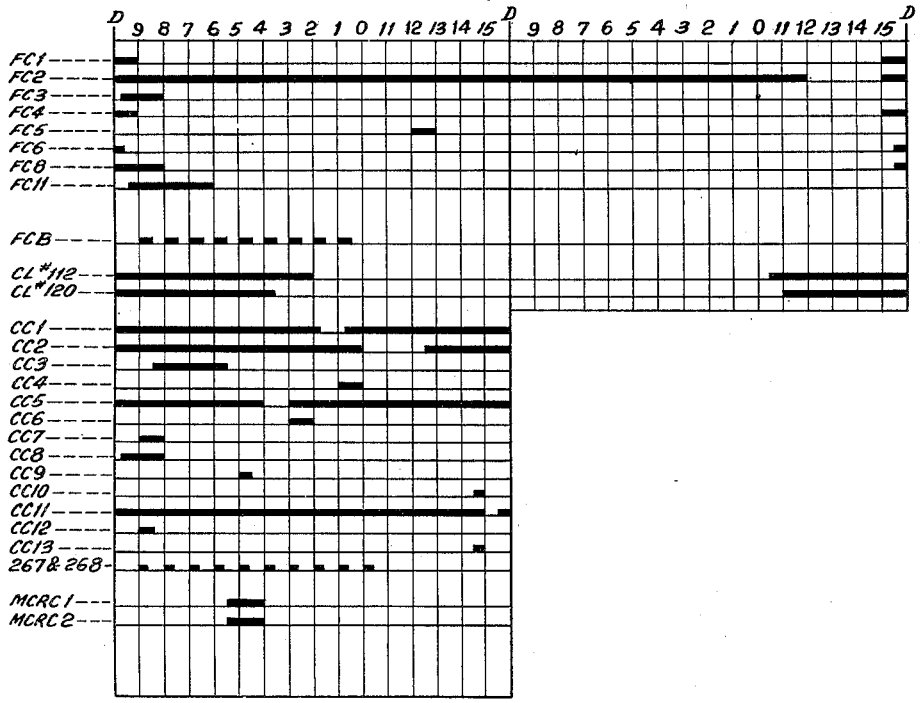
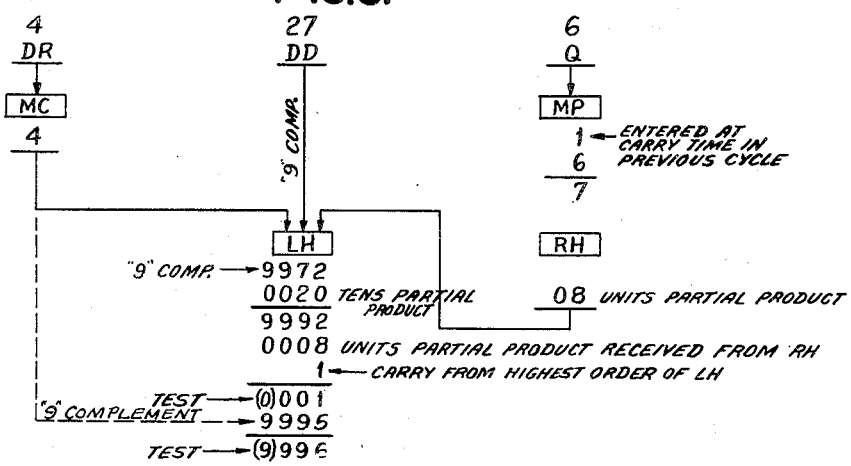
INVENTORS
Stephen W. Dunwell
John N. Wheeler
BY
ATTORNEY.

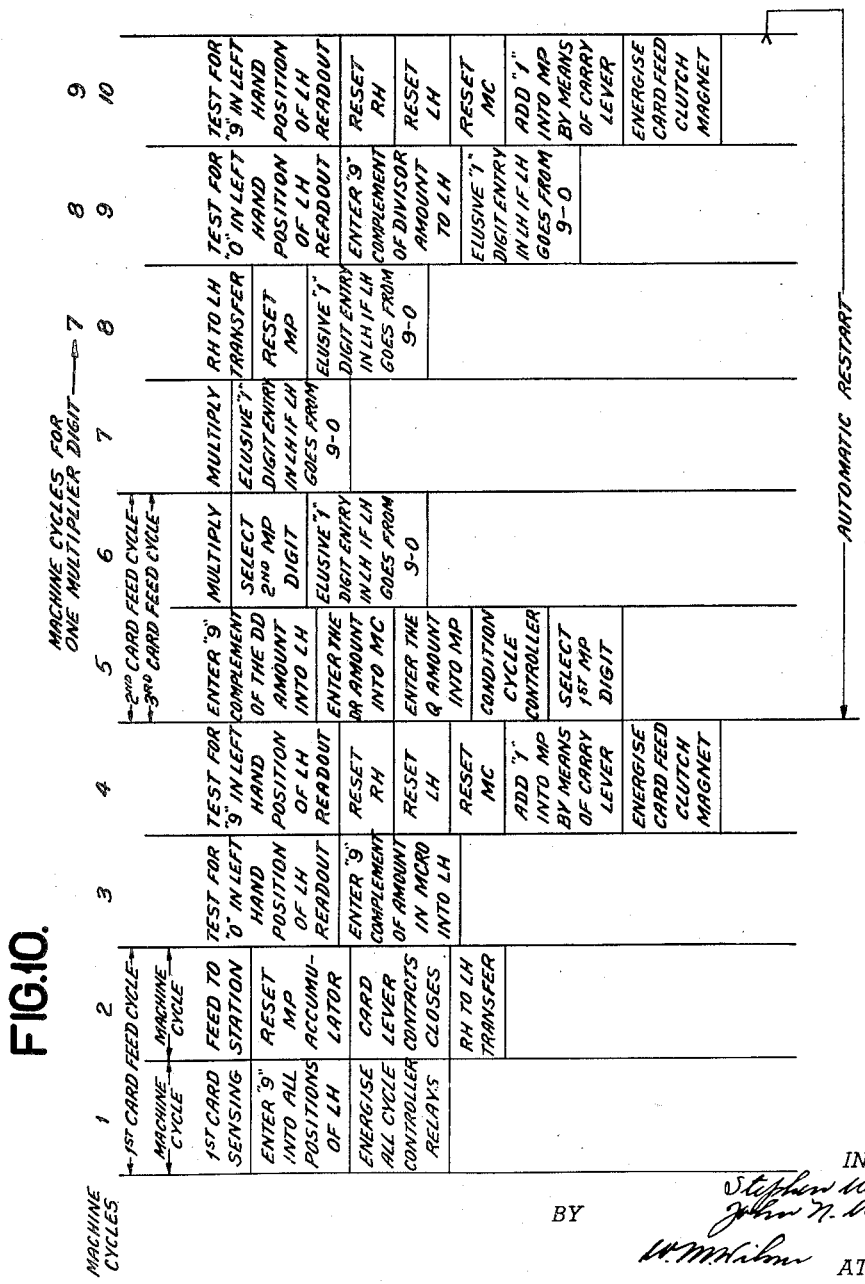

Patented Feb. 9, 1943

2,310,407

UNITED STATES PATENT OFFICE 2,310,407

MACHINE FOR CHECKING QUOTIENT RESULTS

Stephen W. Dunwell, Endicott, and John N. Wheeler, Hawthorne, N. Y., assignors to International Business Machines Corporation, New York, N. Y., a corporation of New York Application April 28, 1942, Serial No. 440,824

7 Claims. (Cl. 235—61.8)

This invention relates to computing machines and more particularly to the type adapted for checking the results of previous computing operations and as shown herein for checking the quotient result of a previous computing operation which is recorded upon a card.

It is evident that the correctness of a division computation can be determined by effecting the repetition of the division computation and a comparison of the quotient results. Alternatively as previously proposed, it is desirable to check the correctness of the quotient result by performing a multiplying operation utilizing the divisor and quotient results as the factors of multiplication. Checking by a multiplying operation is preferable because multiplication is ordinarily a faster operation and another good reason for checking quotient results by a multiplying operation is that it is an entirely different calculating operation and by utilizing different mechanisms the checking operation avoids identical errors which might otherwise occur during both the original and checking computation.

This preference was previously indicated by the proposal to check quotient results by a multiplying operation but in the proposed constructions the remainder of the dividing operation was taken into consideration. This is satisfactory where the remainder is recorded upon the card but in some forms of dividing machines, the remainder is completely disregarded and not even recorded upon the card. Therefore, such forms of checking machines are not suitable for checking quotient results where the remainder is not indicated.

The main object of this invention is, therefore, to provide a machine which will check quotient results recorded on a card without consideration of the remainder.

More specifically it is an object of the invention to provide for the multiplication of the divisor value and the quotient value one of which is augmented by 1 so as to secure a product which is known herein as the "upper limit." This product should obviously be greater than the dividend amount and preferably this determination is effected by subtraction of the dividend amount from the "upper limit" value and if the balance accumulator receiving such amounts indicates a positive condition, it will be known at this point that the quotient result appears to be correct.

A still further object of the invention is to provide a further and final check of the quotient result by subtraction of the divisor amount from this product and the balance amount should be indicated in the balance accumulator as a negative amount which is tested by the machine.

As will be clearer later on from the mathematics involved, the change in condition of the balance accumulator from a positive to negative condition in succession will indicate that the quotient result is correct and bears the proper mathematical relationship to the divisor and dividend factors.

More specifically it is an object of the invention to provide for the checking of the quotient results of successively fed cards automatically and in uninterrupted succession and each time this novel checking arrangement indicates that the quotient result is incorrectly recorded to provide for such indication by a signal light as well as the stopping of the machine.

A still further object of the invention is the provision of an arrangement which will similarly enable the checking of quotient results when the latter have been "rounded off" which, in the art, is a computing operation which augments a higher order wheel by 1 when the lower order wheel represents 5, 6, 7, 8 or 9. Cards which have indicated thereon quotient results which have been "rounded off" are checked by conditioning the machine so that instead of augmenting the quotient result by 1 to secure the "upper limit" the quotient result is augmented by .5 and the multiplication of this increased quotient result and the divisor is performed in the customary manner so as to secure the "upper limit." The same tests are applied to determine whether the dividend falls within the "upper limit" as well as the "lower limit" and the change of the balance accumulator from a positive to a negative condition in succession determines that the "rounded off" quotient result bears the proper mathematical relationship to the divisor and dividend factors recorded on the card.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1a taken together show a somewhat diagrammatic view of the various units of the machine and also the driving mechanism for the various units.

Figs. 2 and 2a taken together show a somewhat diagrammatic view of the punching section of the machine.

Fig. 3 is a sectional detail of certain parts of the punching section of the machine.

Fig. 4 is a detail view showing the preferred form of mechanism for entering a unit in the MP accumulator for augmenting the quotient amount entered therein by unit.

Fig. 5 is a vertical sectional view taken through the card handling and reading section of the machine.

Figs. 6 and 6a show the transfer mechanism for transferring a unit to the units order wheel of an accumulator when the highest order wheel of the same accumulator passes from 9 to 0.

Figure 7C:
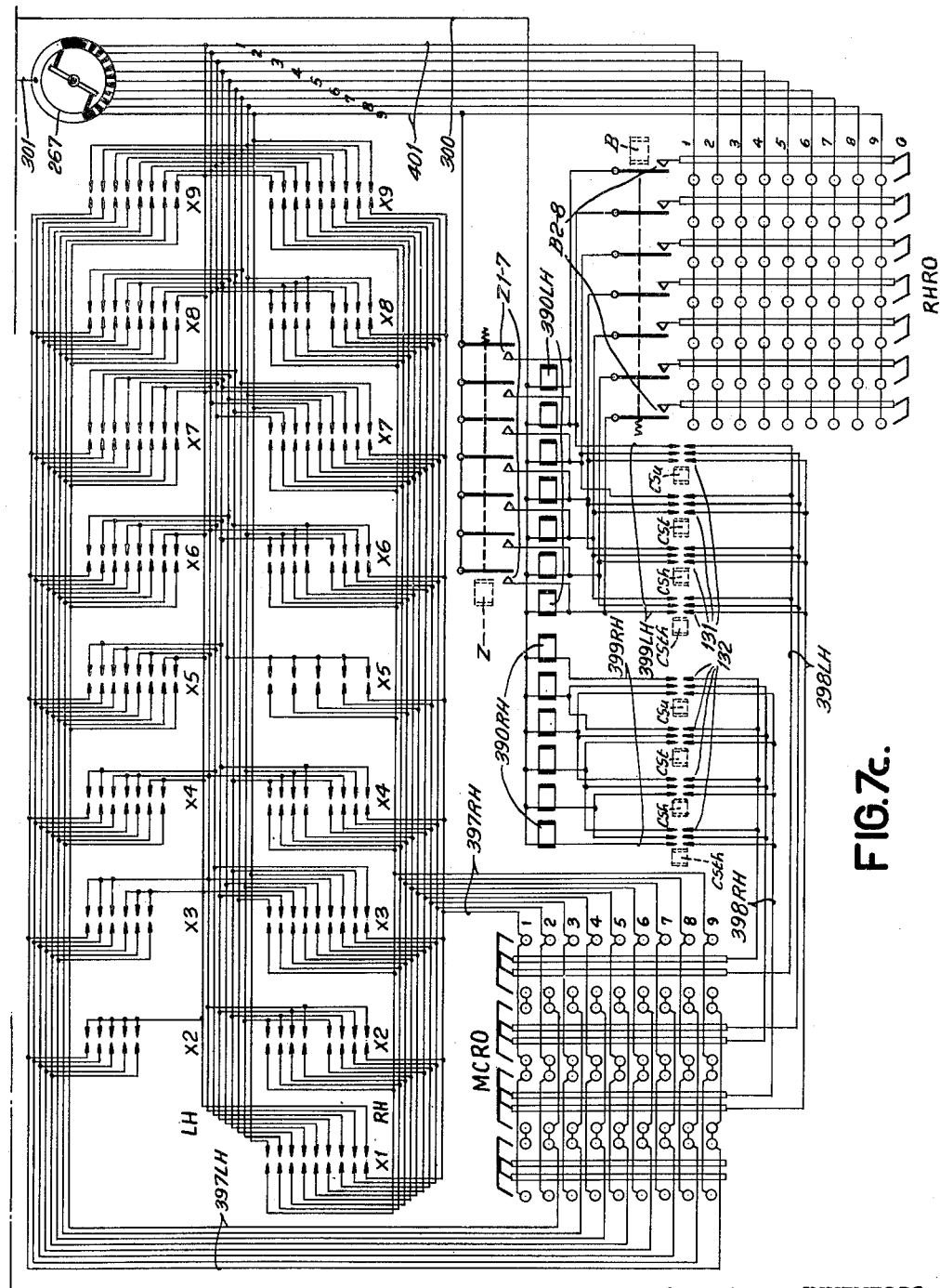

Figs. 7a, 7b and 7c taken together show the circuit diagram of the machine. This view, in being arranged together, should be arranged in the order: 7a at the top; 7b intermediate; and completed by 7c at the bottom.

Fig. 8 is the timing diagram of the machine.

Fig. 9 is an outline indicating the sequence of the computation made by the machine for determining the correctness of a quotient result recorded on the card.

Fig. 10 is the sequence diagram of the machine indicating the operations which are performed as the machine cycles automatically ensue in sequence.

Machine drive

The machine drive is somewhat similar to that shown in detail and fully described in the patent to G. F. Daly, 2,045,437, dated June 23, 1936, and is also shown herein in Figs. 1 and 1a modified in construction to carry out the present invention. In view of the detailed description of the driving mechanism in the aforementioned patent, it will only be generally described herein.

As in the patent, the machine is adapted to be driven by a constantly running motor Z1 which drives a shaft 51 (Fig. 1). The current supply for the motor Z1 is afforded by the lines 300, 301 (Fig. 7a) and this same current supply provides current for the electrical circuits.

Shaft 51, through the worm gear drive 53, drives the vertical shaft 54, and through a worm gear arrangement 55 the shaft 56 is driven, and through the worm drive 55b a parallel drive shaft 56b is also driven. The LH and RH accumulators are driven from the shaft 56 whereas the lower drive shaft 56b is used for actuating parts in the MC, MP, MPR and CS units.

The reset shaft 63 corresponds to the similarly designated reset shaft of the Patent 2,045,437 and is driven in a similar manner by a Geneva drive mechanism which includes the elements designated 57, 58, 59, 60 and 61. In a similar manner the reset shaft 63b is also driven by a Geneva drive consisting of elements 57b, 58b, 59b and 60b. The lower reset shaft 63b is adapted to reset the MP and MC receiving devices by means of the usual electromagnetic one revolution clutches which are rendered operative upon the energization of the respective clutch control magnets 392MP and 392MC. The resetting of the LH and RH accumulators is effected upon the energization of the respective clutch control magnets 392LH and 392RH.

As previously stated, when current is supplied to the lines 300 and 301, the motor Z is set into continual operation. The punching machine utilized in connection with the multiplying machine disclosed in the aforementioned patent is shown in Figs. 2 and 2a herein and while not used for recording operations in connection with the present invention, it is preferably utilized when the machine is to be used for normal multiplying operations with attendant product result recording operations. As stated in the patent, the punch control contacts P5 (Fig. 2) are closed when the punch rack is in the extreme left hand or last column position and the closure of this contact will cause the energization of the relay K, the circuit being from line 300 (Fig. 7a) through relay K, thence through contacts P5 to the line 301. The energization of the K relay closes its contacts K1 (Fig. 7a). Upon the depression of the start key, contacts 275 (Fig. 7a) will be closed, thereby closing a circuit from the line 300 through the relay coil C, thence through contacts 275, thence through relay contacts H2 normally closed, through relay contacts G1 now in the position shown, thence through cam contacts FC2 now closed since the card feed cams FC are at rest to line 301. The energization of the relay coil C causes the closure of its contacts C1 and C2 (Fig. 7a), the relay contacts C1 providing a stick circuit for the relay coil C back through cam contacts FC8 to line 301.

As is well known in the form of machine shown, a series of CC contacts are provided and these are opened and closed during each machine cycle according to the timing in Fig. 8 and in Fig. 1 it will be noted that the cams for clos'ng such contacts have a gear drive connection from the shaft 56.

When the relay contacts C2 close, a circuit is completed through the card feed clutch magnet 384 (Fig. 7a and Fig. 1a) as follows: from line 300, through the relay contacts F1 in the position shown, through the card feed clutch control magnet 384, through cam contacts FC6 now closed, the stop key contacts 275, through the normally closed relay contacts M3, through the relay contacts C2, thence through the punch control contacts P1 (also shown in Fig. 2a) to the line 301. The energization of the card feed clutch control magnet 384 causes the card to be fed from the hopper to the card feeding and handling mechanisms. The card feed clutch control magnet 384 is also shown in Fig. 1a and when energized, causes the engagement of the card feeding clutch to cause the feeding of a card and also the rotation of the cams controlling the contacts FC1—11. The gearing for accomplishing the above purposes is delineated in Fig. 1a and corresponds in structure to that shown in the patent to Daly 2,045,437 and therefore its description is not given herein.

Card feed

The card feeding and card analyzing stations are shown in Fig. 5 and correspond to the arrangement shown in Patent No. 2,045,437. By means of a picker 104, a card from the bottom of the stack of cards 105 is fed to the conventional feeding rollers and during the latter part of this card feeding cycle the card lever 111 is operated to close the card lever contacts 112 which, as shown in Fig. 7a, close a circuit to the relay magnet H. The energization of the H relay magnet opens its contacts H2 and closes its contacts H1. During the card feeding cycle, the FC cams are operating so that in the early part of the first card feeding cycle, the cam contacts FC3 close and complete a circuit through the relay magnet Z, (see Fig. 7a). Referring to Fig. 7c, the energization of the relay magnet Z closes its contacts Z1—7 and the cam contacts FC3 are timed to close at the 9 index time (see Fig. 8) so that "9" digit representing impulses are sent to all of the accumulator control magnets 390LH. The electrical impulse circuit for entering the 9's in the LH accumulator is from the line 301 through emitter 267 which, at the 9 index time, closes a circuit to a "9" digit line 401 which extends through the relay contacts Z1—7 to all of the 390LH accumulator magnets and through such magnets back to the other side of the line 300. Therefore, during the first machine cycle of the first card feed cycle, a series of "9's" are entered in all orders of the LH accumulator and it is stated that at this time the entry is meaningless as far as the checking of dividing operations is concerned, and this initial entry as well as some subsequent operations are effected in the machine so as to enable a continuity in operation since, due to the construction of the machine, the machine would otherwise stop at this time if the 9's were not entered in the LH accumulator.

MP reset

From Fig. 10 it will be noted that during the second machine cycle of the first card feed cycle the MP accumulator is reset but in view of the fact that there was a previous reset of this accumulator, this repeat operation is ineffective but due to the construction of the machine it, nevertheless, takes place. As in the machine shown in the Patent 2,045,437, the machine shown herein is provided with a cycle controller which consists of relay coils Y$u$, Y$t$, Y$h$ and Y$th$ as shown in Fig. 7b. As in the patent, the suffixes $u$, $t$, $h$ and $th$ designate the related columnar orders; $u$ for units, $t$ for tens, etc.

As will be more clearly described, later, after checking dividing operations there is a reset of the MP accumulator which at this time is effective to bring this accumulator to zero. During the first machine cycle, all of the Y relay coils are energized, since the MPRO readout is now at zero in all the orders thereof. Contacts FC5 close at the latter part of the first machine cycle to effect the energization of the relay coil Y$u$ as well as the coils Y$t$, Y$h$ and Y$th$ of higher order. Upon the closure of contacts FC5, an impulse is directed from the line 301 (Fig. 7b), wire 402, wire 403, wire 404, through the cam contacts FC5 to the relay coil M and thence by wire 405 back to the line 300. Also a circuit is closed from FC5 contacts to a wire 406 connecting all "0" segments of MPRO, thence by each brush of MPRO through each Y relay coil, and by wire 405 to line 300. The energization of the relay coils Y$u$, Y$th$ will transfer their respective "2" contacts, as well as their "1" stick contacts. The stick circuit for the Y relay coils extends back through their "1" contacts, back through wire 407 through contacts M1 now closed, through cam contacts CC11, wires 403, 402, to the line 301.

The relay coil M is also held energized by the circuit from line 300, by wire 405, through the M relay coil, the M1 contacts, back through the cam contacts CC11, wires 403, 402 to line 301 and hence relay coil M will remain energized until cam contacts CC11 are opened. Relay contacts B10 open so that the stick circuit for both the Y and M relays is timed by the CC11 contacts.

Relay coils Y$u$, Y$th$ now being energized will transfer their respective "2" contacts and since contacts M2 are now closed, a circuit will be closed from the line 301 through cam contacts CC10, through relay contacts M2, thence serially through the transferred Y$u$, Y$th$ "2" contacts to the relay magnet A, to the line 300. The relay coil A now being energized will close its contacts A2 (Fig. 7a) and at the time cam contacts CC13 close, which is the same time cam contacts CC10 close, a circuit will be closed from line 300 through cam contacts CC13, through relay contacts A2 to the reset magnet 392MP to the line 300. The impulse directed to the last mentioned relay coil will cause the respective reset clutch controlled thereby (see Fig. 1) to cause an idle resetting operation of the MP accumulator during the second machine cycle.

When the relay coil A closes its A1 contacts it will cause relay coil B to energize and the latter will open its contacts B10 (Fig. 7a) causing the stick circuit for the Y and M relay coils to be timed by cam contacts CC11. A stick circuit for B relay coil is provided by its B1 stick contacts and cam contacts CC2 back to line 301.

Transfer from RH accumulator to LH accumulator

The above operation is indicated in the sequence diagram of Fig. 10 and also occurs in the second machine cycle of the first card feed cycle but is also ineffective. However, in order to more clearly understood the later operation where an effectual operation is performed, the circuit connections will now be described.

As will be apparent later on, after checking dividing operations, there is a resetting of the LH accumulator so that in the first RH to LH transfer the digit representation on the latter is not changed and still remains at "9" in all orders due to the previous "9" entry. The energization of the relay A by the circuit previously described causes the closure of relay contacts A1 (Fig. 7a), completing a circuit to the B relay magnet and the latter closes its stick contacts B1, the stick circuit extending back to the line 301 through B1 relay contacts and cam contacts CC2. Referring now to Fig. 7c, the energization of the relay coil B will close its contacts B2—8 and during the closure of these contacts, impulses will be directed from the emitter 267 by means of the digit impulse wires 401 to the RHRO readout. At this time, the RH accumulator represents zeros so that all the brushes of the readout are at the zero digit representing position so that no impulses can be transmitted to the B2—8 contacts to the 390LH accumulator magnets. The LH accumulator is, therefore, unchanged in its digit representation and still represents "9's" in all orders.

Test for "zero" in LHRO

During the succeeding machine cycle or the third machine cycle in which no card feeding operations take place, there is a test for "zero" in the extreme left hand order of the LHRO readout.

In view of the fact that the LH accumulator previously received a series of "9's," the 9 digit representation in the extreme left hand order will, of course, indicate that there is no zero. However, the zero test is made and the circuit is described as follows: The energization of the relay coil B closes the respective relay contacts B9 (Fig. 7a) and upon the closure of cam contacts CC4, the circuit is closed from the line 300, through the relay coil S, cam contacts CC4, relay contacts B9 to the line 301. A stick circuit for the relay S is provided by the stick contacts S1 and cam contacts CC1 back to the line 301. The energization of the relay coil S closes its respective contacts S4 (Fig. 7b), closing a circuit from the line 301, wires 402, 403, through cam contacts CC12, the left hand order readout segment for the LHRO readout, the circuit then being broken because the brush of the readout at this order is at the 9 digit representing position, otherwise the circuit would have been completed through the brush at the zero position, thence through contacts S4 to the CB relay coil to the line 300. In the operation now being described the relay coil CB will not be energized. It is understood that, in starting operations of the machine, this zero test is ineffective.

*Transfer of "9's" complement of amount in MCRO to LH accumulator*

Also during the third machine cycle in starting the operation of the machine, there is an attempt to enter the 9's complement of the amount in the MCRO readout to the LH accumulator and in view of the fact that this readout now represents zero, this operation in starting the machine is ineffectual. This operation is, however, described and the circuit for effecting the operation is as follows: From line 301, wires 402, 403 (Fig. 7b) to the common brush contact segment of the emitter 268, the circuit then extending through the MCRO readout, through relay contacts S5, S6 and S7 which are now closed, thence by wires which extend to contacts D4—6 which are now closed, to the 390SLH accumulator magnets for the units, tens and hundreds orders, to line 300. As will be later described, these magnets are the subtracting control magnets and upon their energization stop the accumulator wheels after initiation of their rotation in a manner to be subsequently described so as to receive the "9's" complement of the amount entered under control of the MCRO readout which is added to the previous "9" entry made in the first cycle. In the operations now being described, this readout now represents a meaningless amount which is subsequently cleared out.

*Test for "9" in LHRO*

This is a test which is effected after the zero test in LHRO to determine whether checking dividing operations have been properly carried out and in starting the machine it is effected in the fourth machine cycle as is shown in Fig. 10. With the relay contacts S2 (Fig. 7a) closed, upon the closure of cam contacts CC6 a circuit is closed from the line 300 through relay coil T, cam contacts CC6, relay contacts S2, back to the line 301 and the stick circuit to continue the energization of the relay coil T is provided through T1 relay contacts and cam contacts CC5 which extend the stick circuit back to the line 301.

During the time that the relay contacts T4 (Fig. 7b) are closed by the energization of the relay coil T, cam contacts CC12 close, thereby extending a circuit from the line 301, wires 402, 403, through cam contacts CC12 to the segment at the extreme left hand order of LHRO readout, through the brush in such order position which is now in contact with the 9 contact point, the circuit then extending through relay contacts T4, through relay coil CA to the line 300. A stick circuit is provided for the relay coil CA, through its respective stick contacts CA3 and back to the line 301 through cam contacts FC4 which are now at rest and are closed.

Summarizing, the presence of 9 in the extreme left hand order of the LHRO readout will cause the energization of the relay coil CA and as will be subsequently described because the CB relay coil has not been energized, the machine will terminate its operations.

During the fourth machine cycle, further operations in the machine are later carried out as outlined in the sequence diagram in Fig. 10 and these will now be described in detail. During the time that the relay coil T is energized, cam contacts CC13 close and these contacts are closed at the end of the third cycle, thereby closing a circuit from the line 300 through the cam contacts CC13, through relay contacts T3 now closed, thence to each of the reset coils 392, RH, LH and MC to the line 301. These reset coils having been energized, they will release their respective reset clutches shown in Fig. 1 so that resetting of the LH, RH and MC accumulators can be effected during the fourth cycle.

*Entry of unit into units order of MP accumulator*

For checking dividing operations by the present arrangement, it is necessary to secure an amount which is known as the "upper limit" and this requires the MP amount to be augmented by the addition of a unit in the units order of the MP receiving device which, as will be later described, receives the quotient amount from the card. This quotient amount augmented by a unit comprises the multiplier amount for the subsequent multiplication and the product amount thereby derived is the "upper limit" amount.

The entry of the unit is effected in a well known manner and is fully shown and described in the patent to C. D. Lake 1,976,617, dated October 9, 1934, wherein Fig. 5 is the same disclosure as Fig. 4 herein. In the patent, the arrangement is used for the entry of the elusive unit and is effected by the energization of the magnet designated 148 in the patent which corresponds to the magnet 148 shown in Fig. 7b. The circuit for energizing this particular magnet 148 is from the line 301 through H1 relay contacts now closed, through MCRC2 cam contacts, (see Fig. 1) through the cam contacts CC9, through the normally closed D10 contacts, through the magnet 148 to the line 300. Cam contacts CC9 close at the 5 index point time at which time contacts MCRC2 are closed, thereby energizing the aforementioned transfer control magnet. From the patent specification on page 5 it will be noted that the energization of the magnet 148 will trip the units pawl carrying arm 102 whereby, during the carrying portion of the machine cycle which herein is the fourth machine cycle, the pawl 100 associated with the units order will advance the units wheel one step.

*Error signal light*

During the fourth machine cycle, while relay contacts T2 are closed, (Fig. 7a) cam contacts CC7 close at the early part of the cycle, thereby closing the circuit from the line 300 through the relay coil W, through relay contacts T2, through cam contacts CC7, then to the line 301, the stick circuit for the relay W being provided by relay contacts W2, and card feed cam contacts FC1 which are now closed and at rest. The energization of the relay coil W will now close its contacts W3, (Fig. 7a) thereby closing a circuit from the line 301, through relay contacts W3, through relay contacts CB2 to the lamp designated "red light," to the line 300, thereby illuminating this lamp which, if a normal checking operation had been carried out, would have indicated an error. In starting conditions, this light is illuminated because the CB2 contacts were not opened. Correctness in the result of the previous dividing operations would have caused both relay contacts CA2 and CB2 to be open so that the light would not be illuminated and furthermore the machine operations would automatically ensue for the following card to be checked. As will now be described, the failure to energize the relay coil CB will automatically terminate machine operations so that in starting conditions, the start key 275 will be again depressed.

Continuity in operations is effected automatically when CA1 and CB1 contacts (Fig. 7a) are both closed which will cause relay coil C to be energized upon closure of cam contacts MCRC1. The failure to energize relay coil C will not cause relay contacts C2 to close and hence card feed clutch magnet 384 will not be energized and under the conditions now described, the start key 275 must again be depressed to cause a second card feed cycle during which cycle the values pertaining to a previous dividing operation are entered.

*Restarting of the machine and concurrent entry of dividend divisor and quotient amount from card*

It may be explained that there is a manual starting up of the card feed for the first card of a run, but after that the machine is automatic in operation for subsequent cards in the run, and the feed for automatic operations is otherwise controlled, being effected automatically each time that the machine detects that the result of the previous dividing computing operation and recorded upon the card as a quotient, is correct. Subsequent card feed operations are initiated automatically when the quotient result has been found to be correct and the manner in which this is performed will be later described.

At this time, the operation which ensues during the fifth machine cycle or the second card feed cycle will now be described and this cycle of operation is initiated by the redepression of the start key which will close its contacts 275 (Fig. 7a), thereby completing a circuit from the line 300, through relay magnet C, start key contacts 275, W1 relay contacts now closed, thence through cam contacts FC2 which are now closed, thence to the line 301. The closure of the relay contacts C2 will effect the energization of the card feed clutch magnet 384 by the circuit previously outlined and thus the second card feed cycle will be initiated and from Fig. 5 it will be noted that during the second card feed cycle, the card previously fed will be moved past the card analyzing brushes 109 and the following card will be advanced from the card hopper 105 to a position where it will retain the card lever 111 in position to retain contacts 112 closed. As the first card passes the analyzing station, the dividend amount on the card is entered in the LH accumulator as a 9's complement, the divisor amount is entered in the MC accumulator and the quotient amount is entered in the MP accumulator (see Fig. 10). The manner in which the entries are effected in the respective accumulators will be subsequently described. In the same manner as described for the machine shown in Patent 2,045,437, provision is accordingly made to cut off the hand initiating control after the operations have been properly started. This is effected in the following manner: At the beginning of the second card feed cycle, the closure of cam contacts FC11 (Fig. 7a) will cause relay coil G to become energized. Current flows from the line 300, through relay coil G, through cam contacts FC11, through the card lever contacts 112 now closed and back to the other side of the line 301. The energization of the relay coil G will transfer the relay contacts G1 to reverse position from that shown, interrupting the circuit to the start key contacts 275 but setting up a stick circuit for the relay coil G, through stick contacts FC2. The energization of the relay coil G will also close relay contacts G2 and establish a stick circuit for the relay coils G and H, through either the FC2 cam contacts or the card lever contacts 112. It may be explained that the making time of cam contacts FC2 overlaps the time when the card lever contacts 112 open between cards. The first card fed engages the card lever 119 and closes the card lever contacts 120 (Fig. 5) so as to complete, at the end of the card feeding cycle, a circuit to the F relay coil. The energization of the F relay coil transfers its contacts F1 to the reverse position shown.

As in Patent 2,045,437, in starting up the machine, the punch racks are in the extreme outer positions, that is, rack 181 (Fig. 2a) is in its extreme right hand position so as to close contacts P1 (Fig. 2a) and P3 (Fig. 2) and the rack 182 is at its extreme left hand position (Fig. 2) so as to close contacts P5. Accordingly, in the circuit diagram (Fig. 7a), contacts P1, P3 and P5 are closed and with contacts P5 closed, the relay coil K will be energized and relay contacts K1 are shifted in reverse position from that shown. Previously there was a shift of relay contacts F1 so that upon the closure of cam contacts CC3, a circuit will be established to the trip control magnet 194, the circuit being as follows: from line 300, to the now transferred F1 relay contacts, cam contacts CC3, the trip control magnet 194, through the now closed P3 contacts and relay contacts K1 to the line 301. The punch trip control magnet 194 is shown in Fig. 3 and is well known in the form of punch disclosed, it being well known that the energization of this magnet causes the closure of contacts 197 (Fig. 3); from the wiring (Fig. 7a), it being obvious that closure of contacts 197 will provide a current supply for the punch driving motor Z2. In the usual manner, contacts 197 are latched closed by latch 198.

As in Patent No. 2,045,437, the card at this time is advanced from the R position to the R1 position (Fig. 2a) for result recording operations but in the present machine, no result punching operations are effected, and therefore, by means of the "high bar" 216 (Fig. 2), the customary skip lever 218 is raised to hold the escapement dog 214 out of engagement with the escapement rack, thereby enabling the card to be moved to the last column position. During the time that the card was moved from the R to the R1 position, rack 182 moved to the right to open contacts P5, thereby deenergizing relay coil K (see Fig. 7a) but when the card reaches the last column position, the contacts P5 are again closed by the rack 182 which re-energizes the relay coil K and causes the closure of contacts K1 and the closure of such relay contacts closes a circuit from the line 301 through relay contacts K1 to the eject magnet 232, thus causing the ejection of the card from the last column position.

Checking relationship of DD, DR and Q determined by previous dividing computation without use of remainder Before describing the arrangement adopted to determine the above, it might be advisable to understand the theory underlining the present method of checking a division computation.

The steps taken in the computation are outlined in Fig. 9 wherein it will be seen that by example the machine determines whether "6" is the correct quotient digit when 27 is divided by 4. The present arrangement determines this by ascertaining whether the dividend falls between two limits, an upper limit and a lower limit which are determined by the following equations.

(1) Lower limit=$DR \times Q = P$
(2) Upper limit=$DR \times (Q+1) = P1$

The "lower limit" is less than the DD amount if there is a remainder, and equal if there is no remainder.

The "upper limit" is greater than the DD amount.

In the computation of Fig. 9:

Lower limit=$6 \times 4 = 24$ which is less than DD (27).

Upper limit=$(6+1) \times 4 = 28$ which is greater than DD (27). Hence, 6 is the correct quotient.

If the quotient had been computed as 5 which is in error, then:

Lower limit=$5 \times 4 = 20$ which is less than DD.
Upper limit=$(5+1) \times 4 = 24$ which is less than DD.

Hence, the equation for "upper limit" is not satisfied.

Again if the quotient had been recorded as 7, which is in error:

Lower limit=$7 \times 4 = 28$ which is greater than DD.
Upper limit=$(7+1) \times 4 = 32$ which is greater than DD.

Hence, the equation for lower limit, in this case, is not satisfied and therefore it is possible to detect whether a quotient result is incorrect by being above or under the correct quotient result merely by comparing the dividend with with the "upper and lower limits," completely disregarding any possible remainder.

To avoid the necessity of performing two multiplying operations which would be necessary to secure both the upper and lower limits it is preferable to secure only the "upper limit" by a multiplying operation and from P1 (Equation 2) subtract the DD value, and the result should be a positive number if the "upper limit" is greater than the dividend. This is shown in Fig. 9 where the product P1 or $(6+1) \times 4 = 28$ has added thereto the nines complement of the DD amount —9972— and plus the elusive "1" entry makes —0001—, which is equivalent to the subtraction of 27 from 28 which gives 01 a positive amount. The test for a positive condition is determined by the test for a zero at the extreme left of the LH accumulator and in Fig. 9 this test for a positive condition is outlined.

The next step avoids the necessity of a second multiplying operation and obviously if from the upper limit the DR amount is subtracted this will give the "lower limit," and in Fig. 9, $28-4=24$, the "lower limit." If the DD amount or 27 is subtracted from the "lower limit" then this amount should be negative, tested for the presence of 9's in the extreme left hand order of LQ. In Fig. 9, since 28—27 has already been computed, the only additional step necessary is to subtract 4 which gives a negative amount when the quotient result is correct and not greater than the correct quotient value. If the quotient result is less than the correct quotient value, then a negative condition in LH is found in the first test. If greater than the correct value, a positive condition in LH is found in the first test but the second test will also indicate a positive condition, which is incorrect.

Entry of DD, DR and Q amounts from card

It was previously intimated that there are concurrent entries from the card of the dividend amount, the divisor amount and the quotient amount and the manner in which such entry operations are effected will now be described in detail.

At this point, it is pointed out that the machine includes a subtracting accumulator which is the LH accumulator provided for the purpose of receiving the 9 complement of the dividend amount. Any form of subtracting accumulator may be utilized for this purpose but preferably is of the type shown in detail and fully described in the aforementioned patent to Lake 1,976,617 wherein Fig. 20 shows the preferred form of subtracting accumulator which is described in detail on page 5 of the patent specification. In the present disclosure, the LH accumulator magnets 390 shown in Fig. 7c correspond to the add control magnets 71 of the accumulator in the Lake patent, whereas the declutching control magnets 130 shown in the patent correspond in function and operation to the subtracting control accumulator magnets 390SLH shown in Fig. 7b. During the initial part of the card feeding cycle, cam contacts FC3 close at the 9 index time (Fig. 8). The relay coil Z (Fig. 7a) is energized by the closure of such contacts to thereby close the relay contacts Zl—7, (Fig. 7c) thereby enabling a 9 digit impulse to be transmitted by the emitter 267 through the contacts Zl—7 to the accumulator magnets 390LH. At this time, all of the accumulator wheels are now clutched and they will be concurrently rotated and differentially stopped according to the position of the holes in the record card of the columns designating the dividend amount. The circuit for causing the energization of the declutching magnets of the LH accumulator is from the line 301 through H1 relay contacts now closed, thence through the circuit breaker contacts FCB to the customary contact roll, thence through the holes in the card to the analyzing brushes 100 which analyze the columns of perforations representing the dividend amount. It will be noted that a plurality of plug connections 414 are made between the plug sockets connected to the brushes 100 for the dividend representing field to a series of plug sockets 303. The impulses are directed by the plug connections 414 to the respective declutching control magnets 390SLH, through the relay contacts D1—6, which are now in the position shown. The energization of the 390SLH declutching control magnets will thereby terminate the rotation of the accumulator wheels at differential times to thereby enter the "9" complement of the dividend amount in the LH accumulator, which operation is outlined in Fig. 9.

For the purpose of illustrating how the quotient results of dividing operations are checked by the present arrangement, Fig. 9 outlines a problem and for simplification small digital values of the divisor, dividend and quotient are selected as shown. In the problem assumed, the divisor is "4," the quotient 6, and the dividend amount 27, and in the previous dividing operation the recorded quotient is designated as "6."

With regard to the entry of the quotient, it will be recalled that in the previous or fourth cycle of machine operation, the magnet 148 was energized which sets the units carry mechanism for operation. The circuits for the entry of the quotient amount are similar to that previously described for the entry of the dividend amount, the impulses being directed by the plug connections 415 to the plug sockets 305 which are connected to the 390MP accumulator magnets through contacts D7—10, now in the position shown. By such entry circuits, the quotient amount is entered in the MP accumulator and at the end of the cycle of operation, the carry mechanism will function in the usual manner so as to augment the entry of "6" by a unit which will thereby cause the MP accumulator to represent —7—.

The divisor amount is entered under control of the brushes 109 for the divisor field and by means of plug connections 416, the entry is directed by plug connections to the sockets 304 which are directly connected to the 390MC accumulator magnets. The MC accumulator will, therefore, receive the divisor amount or "4" in the selected example.

The quotient amount entered in the MP accumulator is utilized as a multiplier amount in subsequent multipliying operations, and the multiplicand amount is the divisor value entered in the MC accumulator. The 9 complement of the dividend amount —27— is entered in the LH accumulator and is shown in Fig. 9. The latter now represents —9972—, but as will be later described a fugitive unit is entered to convert this to the tens complement, for true subtraction.

*Multiplying operation*

During the fifth machine cycle, there is a setup of the cycle controller in the machine which is followed by actual multiplying operations in the sixth machine cycle. The setting up of the column shift means, cycle controller and operation of the multiplying means are similar to that described in the aforementioned Patent No. 2,045,437 and for this reason it is only briefly explained herein.

The cycle controller was previously referred to and it will be recalled consists of the Y relay coils (Fig. 7b). The column shift relays correspond to those in Patent 2,045,437 and comprise the relays designated CS (Fig. 7b) with the subscripts indicating their denominational order. During the end of the fifth machine cycle, which is the first machine cycle of the second card feed cycle, cam contacts FC5 close, thereby closing a circuit from the line 301, wires 402, 403, 404, (Fig. 7b) through cam contacts FC5, through the relay coil M, back to the line 300. Also, if any brush of the multiplier readout MPRO stand upon a zero spot, its corresponding Y magnet will be energized. For the example assumed, no zero appears in the units column of the readout but zeros appear in the tens, hundreds and higher order columns of the readout. With this condition, coils Yth, Yh and Yt become energized when cam contacts FC5 close, the circuits being through such contacts and wire 406 to the zero contact point of each order of the MPR readout where a zero is represented, through the related brushes to the common segment, thence through the associated Y relay coil, wire 405, to the line 300. The energization of the coils Yth, Yh and Yt close their respective "1" stick contacts so that a stick circuit for the aforementioned relays and relay coil M extend back through the M1 stick contacts now closed, cam contacts CC11, wires 403, 402, to the line 301.

Since the brush for the units order of MPRO stands at the "6" digit representing position, the Yu relay will not become energized and its contacts Yu1 and Yu2 will remain in the position shown. The opening of contacts M3 (Fig. 7a) by the energization of the relay coil M will open the circuit to the card feed clutch control magnet 384, preventing initiation of the card feeding operation until the multiplying operation is completed. These contacts are, therefore, in the nature of safety contacts. The machine is now ready to multiply by the amount in the units order of the multiplier. Initiation of multiplication is effected in the following manner. Upon energization of the relay coil M, the relay contacts M2 close. Following the setup of the cycle controller, cam contacts CC10 close. Current is allowed to flow from the line 301 through cam contacts CC10, through relay contacts M2 now closed, through the Yu2 contacts which are in the position shown through the CSu relay magnet and out by the brush which is standing on the 6 spot of the readout in the units order down through the sixth line of the group of lines generally designated 394 to the X6 multiplying relay control magnet to the line 300. The time of flow of current in the path just traced is timed according to the closure of cam contacts CC10. It will be, accordingly, appreciated that there is a concurrent energization of the CSu magnet and the X6 multiplier magnet, since these control magnets are disposed in series relation.

The manner in which multiplying operations are effected is precisely the same as that shown and described in the aforementioned Patent 2,045,437 and for this reason it is briefly explained herein.

Energization of the X6 magnet brings about the multiplying computation and the energization of the column shift coil CSu directs the entries in the proper columnar orders of the RH and LH accumulators in a manner which will be explained.

For the manner of effecting multiplying computations it is sufficient here to state that the energization of the X magnet of the multiplying relays establish their related contacts shown in Fig. 7c, and at the proper time in the operation of the machine, current impulses flow from the emitter 267 through the multiplying relay contacts which in the selected example are the contacts controlled by the X6 multiplying relay. From such contacts, impulses flow over the lines generally designated 397LH and 397RH to the LH and RH sections of the multiplicand readout MCRO which, in the present example, has been set to represent the amount of the divisor, namely, —4—. The multiplicand readout device allows selected impulses to flow to the LH component lines 398LH and to the RH component lines designated 398RH. The lines 398LH extend to the points 131 of the CS relays and lines 399LH from these points extend to the accumulator control magnets 390LH pertain to the LH accumulator. The lines 398RH extend to the points 132 of the column shift relays CS, which points are connected through lines 399RH to 390RH accumulator magnets pertaining to the RH accumulator. In the foregoing way, precisely the same way as disclosed in Patent 2,045,437, partial products are entered into the RH and LH accumulators and successive multiplying cycles ensue. There is a selective energization of the CS magnets to direct the entries into the proper and shifted number orders of the accumulator.

In the present example, the first multiplier digit is selected in the fifth machine cycle and the multiplying operations are actually effected in the following or sixth machine cycle which is the last machine cycle of the second card feed cycle. During this cycle, there is also a selection of the second multiplier digit and in the present case this represents zero but if multiplying operations are to be effected for the next significant digit, a circuit will be closed during the first multiplying cycle as follows: The energization of the CSu relay effects the closure of its contacts CSu1 (Fig. 7b) and the closure of such contacts takes place as an incident to the flow of current to the X6 magnet and the CSu relay, both of which were energized. The Yu relay was not previously energized because its corresponding readout brush did not stand upon a zero spot. The energization of Yu by the closure of CSu1 contacts then shifts the relay contacts Yu1 and Yu2, Yu1 providing the closure of the stick circuit through the M1 stick contacts. Yu2 contacts transfer so that at the end of the cycle in which the first multiplying operation takes place the closure of cam contacts CC10 will then close a circuit from the line 301, through cam contacts CC10, relay contacts M2, through Yu2, contacts now transferred, and assuming that the second order of the MPRO has a digit representation other than zero, thence through the CSt column shift relay through the brush of the readout of this order and depending upon the spot it is standing on through the related wire of the 394 group, say the seventh wire and to the X7 multiplying magnet and then to the line 300. Therefore, multiplication will be effected for the next significant digit and if this should not be in the second denominational order but in a succeeding order, a circuit will be closed as follows: Assuming that the last order represented a digit, the circuit would be from the Yu2 contacts now transferred, thence through Yt2, Yh2, to the CSth relay coil and to the multiplying X magnet, depending upon the particular brush position in the last order. Therefore, if for any succeeding order any of the Y coils have their "2" contacts transferred because their corresponding readout brushes stand at zero, there will be a setup of the multiplier digit for the next significant digit, skipping intervening zeros. This is clearly explained in the aforementioned Patent No. 2,045,437.

Since, in the problem assumed, there is only one multiplier digit, at the end of the sixth machine cycle, upon the closure of cam contacts CC10, a circuit will be completed from line 301, through cam contacts CC10, relay contacts M2 now closed, transferred relay contacts Yu2, Yt2, Yh2 and Yth2 through the A relay coil to the line 300. The energization of the A relay coil causes its contacts A1 and A2 to close. (Fig. 7a.)

*Reset of the MP accumulator*

The reset of the MP accumulator is effected in the machine cycle which follows the cycle in which multiplying operations are effected for the last digit and in the example assumed, this will be performed in the seventh machine cycle. Upon the closure of the A2 contacts and the closure of cam contacts CC13, (Fig. 7a) a circuit will be closed from the line 300, through cam contacts CC13, relay contacts A2, thence to the 392MP reset control magnet, thus causing the reset of the MP accumulator in the well known manner and bringing the MPRO readout to normal digit representation for all orders.

*Transfer from RH to LH accumulator*

In the same cycle in which there is a reset of the MP accumulator, the transfer of the subproduct in the RH accumulator is effected to the LH accumulator. This operation was previously described in the description for the starting up of the operations of the machine but in the cycle of operation now being considered, this operation is effective and is performed by the circuit now described so as to enter —0008— into the LH accumulator. (See Fig. 9.) The energization of the relay coil A will cause the closure of its contacts A1, completing a circuit to the B relay coil (Fig. 7a) and the latter closes its stick contacts B1, the stick circuit extending back to the line 301 through B1 relay contacts and cam contacts CC2. The relay coil B now being energized will open its B10 contacts (Fig. 7b) to permit the stick circuit for relays M and Y to be broken when cam contacts CC11 open. Relay coil B closes its contacts B2—8 (Fig. 7c) and while these contacts are closed, impulses will be directed from the emitter 267 by means of the digit impulse wires 401 to the RHRO readout. This readout now represents, as shown in Fig. 8, the partial product —0000008—, thereby allowing an electrical impulse representing the digit 8 to be transferred to the units order of the LH accumulator effected by the energization of the units order 390LH accumulator magnet. In this manner, the tens partial product on the RH accumulator is transferred to the LH accumulator, being added to the previously entered amounts. Referring to Fig. 9, it will be noted that in the previous entry the LH accumulator received the 9's complement of the dividend amount and subsequently in the multiplying operation received the tens partial product —20— and this combined with the units partial product received from the RH accumulator in the manner just described should cause the LH accumulator to pass through zero. When the LH accumulator passes through zero the elusive one is entered in the units order under control of the highest ordered element of LH when it passes from 9–0, in a manner now to be described.

*Entry of Elusive one*

The elusive one entry is made for the purpose of effecting the subtraction of DD by the tens complement entry, since only the 9's complement of DD has been entered.

The preferred arrangement is shown in Figs. 6 and 6a corresponding to Figs. 30 and 30a of Patent No. 2,097,145. As shown there it is provided to interconnect two sections of an accumulator but its contact operating mechanism works the same way. When the highest order wheel of LH goes from 9–0 it will unlatch the highest order transfer arm 400 (Fig. 6a) releasing for spring operation the carry over part 396 to operate a contact actuating part 397 adapted to close contacts 398. The latter as shown in Fig. 7a establishes a circuit to a magnet 399, which is adapted to trip carry lever latch 400 pertaining to the units order of the LH accumulator. In function magnet 399 is identical to magnet 148 of the MP accumulator and as described for magnet 148 the latter causes the units carry for the units order wheel of the MP accumulator. Magnet 399 in a similar manner effects the units entry in the units order wheel of the LH accumulator. As outlined in Fig. 9 the LH accumulator should be in a positive condition after this entry, and the test is made by testing the extreme left hand order of the LHRO, which is carried out in the next cycle as follows:

*Test for a positive condition in LH accumulator*

After the computing operation has been completed which in effect causes the subtraction of the dividend amount from the upper limit, there is a test of the LHRO readout to determine whether the latter represents a positive condition. This test comprises a test for the extreme left hand order of the LHRO readout to determine whether it represents zero.

The circuit for effecting the energization of the A relay was previously described and when the A relay closes its AI contacts (Fig. 7a) a circuit is closed to the B relay which closes its stick contacts BI, the stick circuit then extending by cam contacts CC2 back to line 301. This stick circuit retains relay coil B energized during the cycle in which there is a transfer from the RH to the LH accumulator. After the entry of the elusive one which is effected in the same cycle, cam contacts CC4 close, thus causing a circuit to be closed from line 300 through the relay coil S, cam contacts CC4, relay contacts B9 to line 301. A stick circuit for the relay S is provided by the stick contacts S1 and cam contacts CC1 back to the line 301.

The energization of relay coil S closes its contacts S4 (Fig. 7b), closing a circuit from the line 301, wires 402, 403 through cam contacts CC12, the left hand order readout segment for the LHRO readout, the brush at the zero position, thence through contacts S4 to the CB relay coil to the line 300. The relay coil CB will close its stick contacts CB3, the stick circuit extending back to the line 300 through cam contacts FC4 which are now closed and at rest.

*Entry of 9's complement of DR amount to LH accumulator*

The next step in the operation of the machine is to subtract the DR amount from the balance amount in LH which operation is outlined in Fig. 9.

Referring to Fig. 7a, the closure of the S3 contacts causes the relay coil Z to be energized at the time cam contacts CC8 close and such contacts, it will be recalled and noted from Fig. 8, close at the 9 index point position of the machine cycle. Therefore, at the time relay contacts Z1—7 (Fig. 7c) closed, "9" digit representing impulses will be sent by the emitter 267 and these impulses are then transmitted through the contacts Z1—7 to the 390LH accumulator magnets thereby initiating the operation of the wheels of the LH accumulator to enter a series of 9's in all orders of the LH accumulator.

During this same cycle, the emitter 268 (Fig. 7b) operates synchronously with the emitter 267 and a circuit is closed from the line 301, wires 402, 403, through the emitter 268 which will transmit impulses to the MCRO readout and under control of this readout through contacts S5, S6 and S7 now closed, thence through contacts D1—6 and to the 390SLH accumulator magnets to line 300. Therefore, digit representing impulses correspond to the amount represented on MCRO are transmitted to the 390SLH accumulator magnets which, it will be recalled, are the declutching magnets for the subtracting accumulator LH. This will terminate the rotation of the accumulator wheels in the well known manner so that the 9's complement of the amount standing on MCRO is entered in the LH accumulator. The latter now represents, in the extreme left hand order, the digit 9 which indicates a negative condition and the test for this negative condition is made in the next machine cycle which, in the example assumed, is the ninth because there is only one multiplier digit.

*Test for negative condition of LHRO*

The test for the presence of a 9 digit representation to determine a negative condition has been previously described in detail and it will be recalled that the closure of relay contacts S2 (Fig. 7a) causes the energization of the relay coil T when cam contacts CC6 close, the relay coil being provided with a stick circuit through stick contacts T1 and cam contacts CC5 back to the line 301. The energization of the relay coil T will close its contacts T4 (Fig. 7b) and a 9's test circuit will be closed from the line 301, wires 402, 403, through cam contacts CC12, thence through the brush of the extreme left hand order of LHRO which is now at the 9 digit representing position, the circuit being extended through the segment, contact point and contacting brush at the 9 digit position, thence through relay contacts T4 to the CA relay coil to the line 300. The relay coil CA now being energized will close its stick contact CA3, the stick circuit being extended back to the line 301 through the now closed cam contacts FC4. Therefore, the presence of a 9 after the entry of the 9's complement of the divisor amount in the LH accumulator will be reflected by the energization of the CA relay coil.

*Resetting of RH, LH and MC accumulators*

Resetting of these accumulators has been previously described in detail and it will be recalled is effected when cam contacts CC13 close (Fig. 7a) the closure of such contacts completing a circuit from the line 300 through the CC13 contacts, thence through relay contacts T3 now closed to the 392MC, LH and RH reset magnets which are connected to the line 301. These resetting coils now having been energized will reset their respective accumulators and during the resetting of the MC accumulator, contacts MCRC1 (Fig. 1) are closed.

*Automatic restarting of the machine*

When both the positive and the negative tests have been successively made to determine if such conditions are successively found in LH, the relay coils CA and CB are energized, and this indication of the correctness of the quotient result of the previous dividing operation causes the next checking operation to automatically ensue.

With relay contacts CA1 and CB1 (Fig. 7a) now closed, upon the closure of cam contacts MCRC1, a circuit will be closed from the line 300, through the relay coil C, thence through contacts MCRC1, relay contacts CA1, relay contacts CB1, thence through G3 contacts which are now closed to line 301. The relay coil C now being energized will close its contacts C2, thus closing a circuit from the line 300 through F1 contacts now closed, the card feed clutch magnet 384, FC6 contacts now closed, stop key contacts 276 now closed, relay contacts M3 now closed, thence through relay contacts C2 and punch control contacts P1 to the line 301. The energization of the card feed clutch magnet 384 will automatically initiate a successive card feeding cycle and machine operations will be automatically effected in the sequence previously described and outlined in Fig. 10 and in the third card feed cycle operations will be initiated previously outlined for the fifth machine cycle (see Fig. 10).

*Entry of unit in units order of MP accumulator*

The means for effecting the entry of the unit in the MP accumulator to secure the "upper limit" amount was previously described and in the example assumed is carried out in the ninth machine cycle in precisely the same manner as it is effected during the fourth machine cycle. It will be recalled for this operation that the circuit for energizing the magnet 148 (Fig. 7b) is from the line 301, through the H1 relay contacts now closed, through MCRC2 cam contacts, through the cam contacts CC9, the normally closed D10 contacts and through the magnet 148 to the line 300. It will also be remembered that the energization of the magnet 148 will trip the units pawl carry arm 102 (Fig. 4) so as to advance the units order wheel one step.

*Error indication when recorded quotient result is incorrect*

Previously, in the outline of the theory forming the basis of the error determining mechanism, it was described how the equations would not be satisfied if the quotient result is incorrectly computed and recorded upon the card, the two instances of error being the recording of a quotient result which is less than the correct quotient result and also when the quotient result is greater than the correct quotient result. At this time, there will now be considered the machine operations which are effected when cards bearing incorrectly recorded quotient amounts are passed through the machine. In the first case, the operations which take place when an under-quotient amount is recorded will be considered and the previous incorrect quotient digit "5" will be taken by way of example. The machine operations ensue as outlined in Fig. 9 and the computation is performed as follows:

$$9972 = 9\text{'s complement of DD} = 27$$
$$0024 = (5+1) \times 4$$

(9)996 (Note.—No elusive "1" digit entry)
9995  9's complement of DR 9991
1 elusive "1" digit entry (9)992

From the above outline it will be observed that the subtraction of the DD amount from the upper limit 24 results in a negative condition in the LH accumulator. During the machine operation in which there is a test for zero, the circuit will not be completed to the CB relay coil (Fig. 7b) because the brush at the extreme left hand order LHRO is at the 9 digit position. The subtraction of the 9's complement of the DR amount also retains the negative condition of the LH accumulator and when the test for the negative condition occurs, due to the fact that the extreme left hand order of LHRO is at 9, the circuit will be completed through CA relay coil. The failure to energize both relay coils CB and CA indicates that the quotient result is in error. As previously described, the energization of the T relay coil (Fig. 7a) will close its T2 contacts, energizing relay coil W during the last machine cycle of operation which, in the example assumed, is the ninth. The stick circuit for relay coil is provided by the relay contacts W2 and FC1 cam contacts now closed, back to line 301. Since only relay coil CA is energized, its CA2 contacts will be open but the CB2 contacts will remain closed so that upon closure of contacts W3 a circuit will be completed from line 301 through relay contacts W3, CB2 contacts, thence through the lamp designated "red light" to the line 300. Thereby the signal light will be illuminated and the machine will also stop as previously described which will give the proper indication to the operator of the incorrectness in the result of the previous dividing operation. The operator can now remove the incorrect card for examination and subsequent checking operations for following cards will be initiated by the manual operation of the start key 275 as previously stated.

In the event that the quotient result is incorrect by being greater than the correct quotient value, similar error indicating operations will ensue. If, by way of example, the incorrect quotient result should be recorded as 7, the computation will be carried out by the machine as follows:

$$9972 = 9\text{'s complement of DD} = 27$$
$$0032 = (7+1) \times 4$$

0004
1 = elusive "1" digit entry (0)005
9995 = 9's complement of DR 0000
1 = elusive "1" digit entry (0)001

During the test for the positive condition of the LH accumulator relay coil CB will be energized in the normal manner but, however, when the test for the negative condition ensues, it will be observed that the relay coil CA is not energized because the LH accumulator is retained in its positive condition. Therefore, relay contacts CA2 will remain in their normally closed position (Fig. 7a) indicating by the illumination of the signal light and the stopping of the machine that the quotient result is incorrectly recorded and does not bear the proper mathematical relationship to the dividend and divisor values.

Attention is directed to the fact that in the above computation the addition of the 9's complement of the DR amount to the balance amount 0005 in the LH accumulator causes the extreme left hand wheel LH accumulator to pass from 9 to 0 by means of a carry operation and this will cause, in the manner previously described the entry of the elusive 1 in the entry orders of the accumulator wheel of the LH accumulator performed by the mechanism shown in Figs. 6 and 6a. However, this unit entry while made under the conditions just described, will not change the positive condition of the LH accumulator, it being merely augmented by the unit entry in the units order wheel. Therefore, with some computing problems, the elusive 1 digit entry will be made at times without, however, preventing the detecting mechanism from indicating that certain such problems involve an incorrectly recorded quotient result.

*Checking of quotient amounts previously rounded off and so recorded*

It is desirable that provision be made to check quotient amounts which have been previously rounded off. In the art, rounding off consists in changing the next higher digit by a unit when the next lower digit is 5-9. In division calculations this may be effected in several ways and one known way consists in securing an extra quotient digit and adding "5" thereto. This may or may not augment the next higher digit through a carry operation. In the problem assumed, if 27 was divided by 4 to two quotient digits then 6.7 would be secured and by adding .5 the quotient amount would be 7.2, and will be recorded as —7. Such rounded off quotient digits are checked by the machine for possible error and for cards of this type switch SW (Fig. 7a) is closed to energize relay coil D. The latter shifts its contacts DI—6 and D7—10. The effect of shifting of contacts DI—6 is to cause the DD entry to be made in accumulator orders one higher. Closure of contacts D10 will now connect the 390MP$u$ magnet for control by contacts CC9 and the quotient digit "7" will be entered in the tens order of MP. The complete circuit for the "5" entry is from line 301, contacts HI now closed, cam contacts MCRC2, cam contacts CC9, relay magnet 390MP$u$, to line 300.

In the entry of the MP amount cam contacts CC9 closing at the "5" index time (see Fig. 9) will send an impulse to 390MP$u$ and thus the units order wheel will receive a five entry, and the tens the entry of "7". The MPRO readout now represents 75 and in multiplying there is a multiplication in the usual manner of two multiplier digits.

The computation by the machine is expressed as follows:

```
DR    DD     Q rounded off
 4    270    70
             5 correction in MP
             —
             75
             LH   accumulator
             9729 = nines complement DD
             0220 = tens partial product
             ————
             9949
             0080 = units partial product
             ————
             0029
                1 = carry from highest or-
             ————   der
Test for positive (0) 030
             9959 = 9's complement DR
Test for negative (9) 989
```

With the exception of the denominational shift in LH and MP, the computation is carried out in the usual manner and the tests for positive and negative condition of LH are also carried out as previously described. Errors in quotient results, either over or under will be ascertained by the failure to obtain successively a positive then negative condition in LH, all as previously described and if incorrect the error will be indicated.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class controlled by cards designating divisor and dividend amounts and a related quotient result amount, a plurality of receiving means each for receiving a respective divisor and quotient amount from a card, means for entering a unit in the quotient receiving means to augment the quotient amount by a unit, an accumulator, multiplying means under control of said divisor receiving means and said quotient receiving means for effecting after the latter has received the unit entry the multiplication of the divisor amount and augmented quotient amount and for entering the product in said accumulator, card controlled means for subtractively entering the dividend amount in said accumulator to obtain a balance amount of the product amount and the subtracted dividend amount, means operative thereafter for testing said accumulator for ascertaining whether the accumulator now represents a positive condition and means controlled thereby and set when a positive condition is ascertained, means operative after the test for a positive condition has been completed for subtracting under control of the divisor receiving means said divisor amount from the balance amount in said accumulator to obtain a second balance amount, means for then testing the accumulator to determine whether the second balance amount represented thereon indicates a negative condition of said accumulator, and a supplemental means controlled thereby and set when a negative condition is ascertained.

2. In a machine of the class controlled by cards designating divisor and dividend amounts and a related quotient result amount, a plurality of receiving means each for receiving a respective divisor and quotient amount from a card, means for entering a unit in the quotient receiving means to augment the quotient amount by a unit, an accumulator, multiplying means under control of said divisor receiving means and said quotient receiving means for effecting after the latter has received the unit entry the multiplication of the divisor amount and augmented quotient amount and for entering the computed product in said accumulator, card controlled means for subtractively entering the dividend amount in said accumulator to obtain a balance amount of the product amount and the subtracted dividend amount, means operative thereafter for testing said accumulator for ascertaining whether the accumulator represents a positive condition, settable means controlled thereby and set when a positive condition is ascertained, means operative after the test for a positive condition has been completed for subtracting under control of the divisor receiving means said divisor amount from the balance amount in said accumulator to obtain a second balance amount, means for then testing the accumulator to determine whether the second balance amount represented thereon indicates a negative condition of said accumulator, a supplemental settable means controlled thereby and set when a negative condition is ascertained, and an indicator controlled jointly by said settable means for indicating the failure of the settable means to be set in succession to represent successive positive and negative conditions of said accumulator.

3. In a machine of the class controlled by successively fed cards each designating divisor and dividend amounts and a related quotient result amount, feeding means for feeding said cards in succession, a plurality of receiving means each for receiving a respective divisor and quotient amount from a card, means for entering a unit in the quotient receiving means to augment the quotient amount by a unit, an accumulator, multiplying means under control of said divisor receiving means and said quotient receiving means for effecting after the latter has received the unit entry the multiplication of the divisor amount and augmented quotient amount and for entering the computed product in said accumulator, means for subtractively entering the dividend amount from the card in said accumulator to obtain a balance amount of the product amount and the subtracted dividend amount, means operative after said accumulator represents a balance amount for testing said accumulator for ascertaining whether the accumulator represents a positive condition, means operative after the test for a positive condition has been completed for subtracting under control of the divisor receiving means said divisor amount from the balance amount in said accumulator to obtain a second balance amount, means for then testing the accumulator to determine whether the second balance amount thereon represents a negative condition of said accumulator, and means controlled by said testing means for causing, when said testing means indicates the failure of the accumulator to represent a positive and negative condition in succession, the suppression of the operation of said feeding means.

4. A machine for checking a quotient result comprising a plurality of receiving means for receiving the respective related divisor and quotient amounts, a dividend receiving means comprising a balance accumulator, means for entering a unit in said quotient receiving means to augment by a unit the received quotient amount, means for thereafter multiplying under control of said quotient receiving means and said divisor receiving means the amounts represented therein and for entering the computed product amount in said accumulator, means for subtractively entering a dividend amount in said accumulator to provide with the product entered a first balance amount therein, means for then testing said accumulator to ascertain whether the first balance amount now represents a positive amount, means for then subtracting from said accumulator under control of said divisor receiving means the divisor amount to provide a second balance amount therein, and means for then testing said accumulator to ascertain whether said accumulator now represents a negative amount.

5. A machine for checking a quotient result comprising a plurality of receiving means for receiving the respective related divisor and quotient amounts, a dividend receiving means comprising a balance accumulator, means for entering a unit in said quotient receiving means to augment by a unit the received quotient amount, means for thereafter multiplying under control of said quotient receiving means and said divisor receiving means the amounts represented therein and for entering the computed product amount in said accumulator, means for entering the tens complement of a related dividend amount in said accumulator to provide with the product entered a first balance amount therein, means for testing said accumulator for the presence of a zero in the highest order to ascertain whether said accumulator represents a positive balance amount, means for then entering in said accumulator under control of said divisor receiving means the complement of said divisor to provide a second balance amount therein, and means for then testing said accumulator for the presence of a 9 in the highest order to ascertain whether said accumulator now represents a negative balance amount.

6. A machine for checking a quotient result comprising a plurality of receiving means for receiving the respective divisor and related quotient amounts, a dividend receiving means comprising an accumulator and provided with digit representing means set thereby and means to effect a units carry in the units order wheel, means for entering a unit in said quotient receiving means to augment by a unit the received quotient amount, means for thereafter multiplying under control of said quotient receiving means and said divisor receiving means the amounts represented thereon and for entering the computed product amount in said accumulator, means for subtractively entering the nines complement of a dividend amount in said accumulator, which complement amount and said product amount should cause said highest order wheel of said accumulator to go from 9–0, means controlled by said highest order wheel when it passes from 9–0 to cause the operation of the units carry means for the units order, to thereby cause the entry of the dividend amount in said accumulator to be effected as a tens complement thereof, means for then testing the highest order of said digit representing means to determine whether a zero is represented thereby, means for then subtracting from said balance amount in said accumulator the complement of said divisor amount derived from the divisor receiving means whereby said accumulator should now represent a second balance amount which should be negative, indicated by a 9 in said highest order of said digit representing means, and means for thereafter testing the highest order of said digit representing means to determine whether a 9 is now represented, and an error signifying means controlled by the aforesaid testing means and operative to signify the failure of said accumulator to represent in the highest order thereof 0 and 9 in succession.

7. In a machine for checking a previously rounded off recorded quotient result comprising card controlled means for entering the divisor and quotient amount in respective receiving means, means for shifting the entry of said quotient amount by one order leaving the lowest order element of said quotient receiving means free of such quotient entry amount, a "5" entry means for entering a "5" digit in said quotient receiving means in said lowest order element, an accumulator, means for thereafter multiplying under control of said quotient receiving means and said divisor receiving means the amounts therein and including product entering means to enter the computed product in said accumulator, card controlled means for entering under control of entry shift means associated with said accumulator the 9's complement of said dividend amount in said accumulator in orders above the units or lowest order and including the entry of "9" in the lowest or units order element of the accumulator, means for entering the elusive unit in said lowest or units order element of said accumulator, said product entry, complement entry and elusive unit entry causing said accumulator to represent a balance amount which should be a positive amount, means for testing the highest order of said accumulator to determine whether a zero is represented thereon to ascertain a positive condition of the accumulator, means for entering under control of said divisor receiving means and said entry shift means for the accumulator the "9's" complement of the divisor amount in orders one above the units or lowest order and for entering "9" in the aforesaid lowest or units order of the accumulator whereby said accumulator now represents a second balance amount which should be negative, indicated by a 9 in the highest order of said accumulator, and means for thereafter testing the highest order of said accumulator to determine whether a 9 is represented signifying a negative condition of said accumulator, and an error signifying means controlled by the aforesaid testing means and operative to signify the failure of said accumulator to represent 0 and 9 in succession.

STEPHEN W. DUNWELL.
JOHN N. WHEELER.